(12) United States Patent
Hosoda

(10) Patent No.: US 10,560,970 B2
(45) Date of Patent: Feb. 11, 2020

(54) INFORMATION PROCESSING APPARATUS AND METHOD AND PROGRAM FOR CONTROLLING INFORMATION PROCESSING APPARATUS

(71) Applicant: CANON KABUSHIKI KAISHA, Tokyo (JP)

(72) Inventor: Yasuhiro Hosoda, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 15/666,934

(22) Filed: Aug. 2, 2017

(65) Prior Publication Data

US 2018/0042056 A1 Feb. 8, 2018

(30) Foreign Application Priority Data

Aug. 5, 2016 (JP) ................. 2016-154401

(51) Int. Cl.
| | |
|---|---|
| *H04W 76/10* | (2018.01) |
| *G06F 3/12* | (2006.01) |
| *H04W 40/24* | (2009.01) |
| *H04W 40/20* | (2009.01) |
| *H04W 40/10* | (2009.01) |
| *H04L 29/06* | (2006.01) |
| *H04W 84/12* | (2009.01) |
| *H04W 92/10* | (2009.01) |

(52) U.S. Cl.
CPC .......... *H04W 76/10* (2018.02); *G06F 3/1204* (2013.01); *G06F 3/1236* (2013.01); *G06F 3/1238* (2013.01); *G06F 3/1292* (2013.01); *G06F 3/1294* (2013.01); *H04L 29/06326* (2013.01); *H04W 40/10* (2013.01); *H04W 40/20* (2013.01); *H04W 40/242* (2013.01); *H04W 84/12* (2013.01); *H04W 92/10* (2013.01)

(58) Field of Classification Search
CPC .... G06F 3/1292; G06F 3/1238; G06F 3/1236; G06F 3/1294; G06F 3/1204; H04W 76/02; H04W 76/00; H04W 76/10; H04W 40/24; H04W 40/242; H04W 40/246; H04W 48/00; H04W 48/16; H04W 48/17; H04W 48/18; H04W 48/20; H04W 8/005; H04L 29/06326; H04L 41/12; H04L 45/02
See application file for complete search history.

(56) References Cited

U.S. PATENT DOCUMENTS

| | | | |
|---|---|---|---|
| 9,894,604 B1* | 2/2018 | Tran .................. | H04W 48/20 |
| 2012/0170471 A1* | 7/2012 | Brown ................ | H04W 48/20 370/252 |
| 2012/0170513 A1* | 7/2012 | Vogedes ............... | H04W 24/02 370/328 |

(Continued)

FOREIGN PATENT DOCUMENTS

JP 2010-98765 A 4/2010

*Primary Examiner* — Warner Wong
(74) *Attorney, Agent, or Firm* — Canon U.S.A., Inc. IP Division

(57) ABSTRACT

An information processing apparatus is configured to acquire the history of access points previously connected to the information processing apparatus and to enable selection, based on the acquired history, an access point to be set for a device. Based on information on an access point selected from the displayed access points, the information processing apparatus notifies the device of a setting for connection to the selected access point.

19 Claims, 10 Drawing Sheets

(56) References Cited

U.S. PATENT DOCUMENTS

| | | | |
|---|---|---|---|
| 2013/0201525 A1* | 8/2013 | Niwa | G06F 3/1236 |
| | | | 358/1.15 |
| 2013/0258402 A1* | 10/2013 | Arai | G06K 15/40 |
| | | | 358/1.15 |
| 2013/0260683 A1* | 10/2013 | Suzuki | H04W 76/10 |
| | | | 455/41.1 |
| 2014/0176981 A1* | 6/2014 | Asai | G06K 15/4045 |
| | | | 358/1.13 |
| 2014/0179317 A1* | 6/2014 | Tanaka | H04W 60/00 |
| | | | 455/435.2 |
| 2014/0320886 A1* | 10/2014 | Uchikawa | H04N 1/4433 |
| | | | 358/1.14 |
| 2014/0337404 A1* | 11/2014 | Jitkoff | G06F 17/30884 |
| | | | 709/203 |
| 2015/0188940 A1* | 7/2015 | Lapidous | H04W 12/12 |
| | | | 726/15 |
| 2015/0189023 A1* | 7/2015 | Kubota | H04L 67/141 |
| | | | 455/7 |
| 2016/0011830 A1* | 1/2016 | Asakura | H04W 76/10 |
| | | | 358/1.15 |
| 2019/0034142 A1* | 1/2019 | Uchikawa | H04W 4/00 |

* cited by examiner

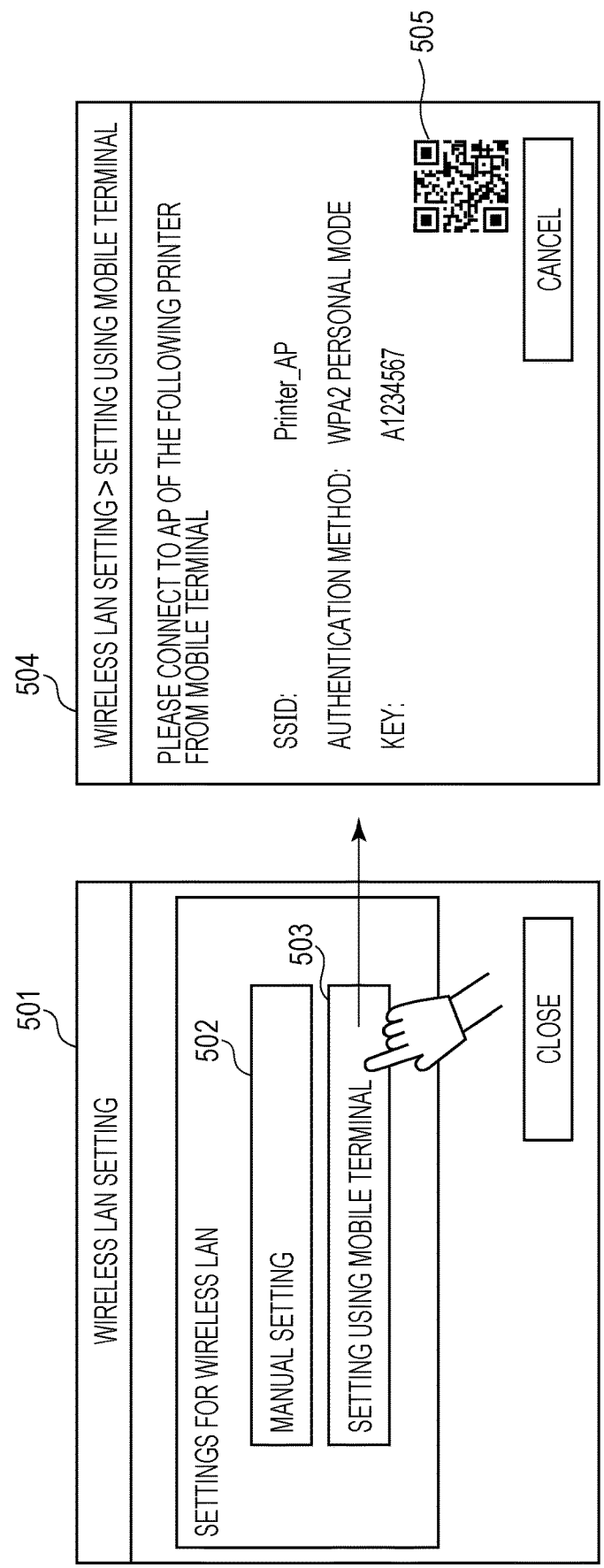

INFORMATION PROCESSING APPARATUS AND METHOD AND PROGRAM FOR CONTROLLING INFORMATION PROCESSING APPARATUS

BACKGROUND

Field

The present disclosure relates to an information processing apparatus configured to perform network setting for a device.

Description of the Related Art

In recent years, various devices have been developed that connect to a network. For example, a printing apparatus. In order to easily change settings for connecting a device such as a printing apparatus to a network, a method in which network setting is performed for the device via an operation section of an information processing apparatus different from the device has been known (e.g., a setting method described in Japanese Patent Laid-Open No. 2010-98765).

The information processing apparatus described in Japanese Patent Laid-Open No. 2010-98765 is configured to cause the device to search access points (APs) around the device. The information processing apparatus is configured to receive the list of APs found by searching, and display these APs as connection destination candidates on the operation section. From the connection destination candidates displayed on the operation section of the information processing apparatus, a user selects an AP to be connected to the device. The information processing apparatus is configured to transmit information on the selected AP to the device. Based on the AP information received from the information processing apparatus, the device can perform network setting for a connection destination.

SUMMARY

An information processing apparatus communicable with a device including a wireless interface includes a wireless interface connected to an access point to perform wireless communication with the device; a display device, a memory storing instructions, and at least one processor, which when executing the instructions causes the information processing apparatus to perform operations including displaying, on the display device, information on an access point previously connected to the information processing apparatus, wherein the information is stored in the information processing apparatus, and notifying the device, based on information on an access point selected from the displayed access point information, a setting for connection to the selected access point.

Further features will become apparent from the following description of exemplary embodiments with reference to the attached drawings.

BRIEF DESCRIPTION OF THE DRAWINGS

FIG. 5 is a view for describing examples of screens displayed on an operation section of the printing apparatus.

DESCRIPTION OF THE EMBODIMENTS

Figure 1:
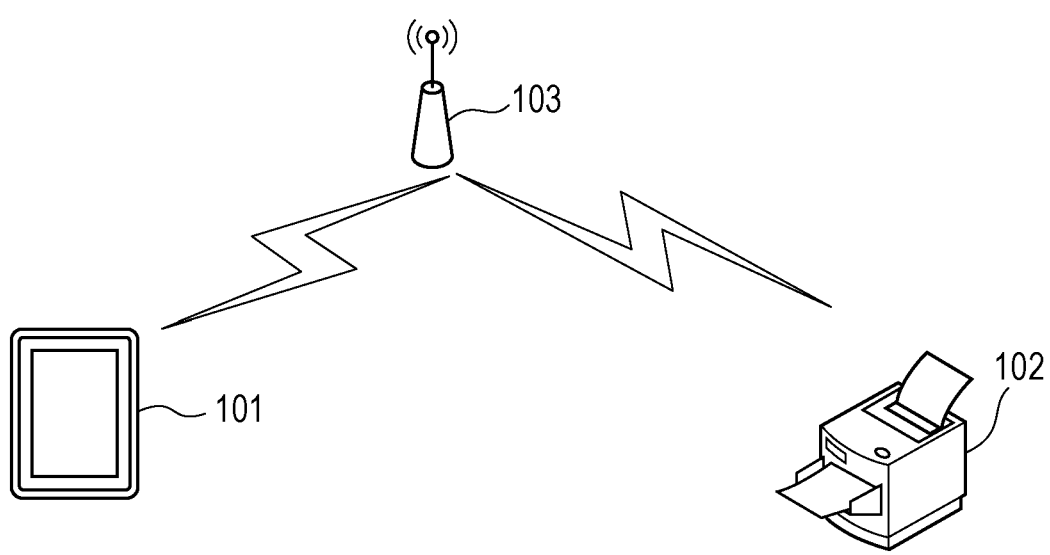
FIG. 1 is a view of an example of an outline of a communication system.

For participation of a device in a network, it is often a case that a user of an information processing apparatus wishes to cause the device to participate in a network provided by an AP regularly used by the user. Thus, in a case where the user wishes to set a certain AP as a connection destination of the device, there is a high probability that the user's information processing apparatus previously connected to the AP.

The present embodiment provides that in a case where an AP is to be used as a connection destination of a device for participation of the device in a network, the AP is set from an information processing apparatus previously connected to by the information processing apparatus. A list of APs previously connected to are displayed, an AP selected from the list, and network setting for the device is performed based on the selected AP.

The embodiments will be described below with reference to the drawings. The embodiments are not intended to limit the scope of the claims. For example, not all of the combinations of the described features may be essential for implementing the embodiments.

<First Embodiment>

First, a configuration of a communication system will be described with reference to FIG. 1. The communication system of the present embodiment includes an information processing apparatus 101, a printing apparatus 102, and an AP 103.

The information processing apparatus 101 is configured to execute wireless communication based on IEEE 802.11 standards (hereinafter referred to as "802.11 standards"). The information processing apparatus 101 connects to a network provided by the AP 103 such that a user inputs, to the information processing apparatus 101, an extended service set identifier (ESSID) and a security key for connection to the AP 103.

The printing apparatus 102 is a device configured to receive print data via the network to perform printing. When the ESSID and the security key for connection to the AP 103 are set as wireless network settings for the printing apparatus 102, the information processing apparatus 101 and the printing apparatus 102 can perform wireless communication via the AP 103.

In the present embodiment, a configuration in which the information processing apparatus 101 and the printing apparatus 102 execute wireless communication via the AP 103 will be hereinafter referred to as "infrastructure wireless communication."

The information processing apparatus 101 communicates with the printing apparatus 102 via the AP 103. The information processing apparatus 101 can transmit a print job to the printing apparatus 102 via the AP 103. Upon receipt of the print job, the printing apparatus 102 executes printing based on the received print job.

The printing apparatus 102 can also operate in an access point mode. In the case of operating in the access point mode, the printing apparatus 102 operates as a software access point. The printing apparatus 102 generates an ESSID and a security key, and acts as if the printing apparatus 102 itself is an AP. In the case of the printing apparatus 102 operating in the access point mode, the information processing apparatus 101 connects to a software AP provided by the printing apparatus 102.

The user inputs, to the information processing apparatus 101, the ESSID and the security key generated by the printing apparatus 102, and in this manner, the information processing apparatus 101 is connected to the software AP provided by the printing apparatus 102. The information processing apparatus 101 connected to the AP provided by the printing apparatus 102 can execute direct wireless communication with the printing apparatus 102 without a relay apparatus, such as the AP 103, being interposed therebetween.

In the present embodiment, a configuration in which the information processing apparatus 101 executes direct wireless communication with the printing apparatus 102 without the relay apparatus, such as AP 103, being interposed therebetween is hereinafter referred to as "direct wireless communication." The information processing apparatus 101 can utilize the infrastructure wireless communication or the direct wireless communication to communicate with the printing apparatus 102.

A smart phone or a tablet PC is used as an example of the information processing apparatus in the present embodiment. However, the use of these devices is not seen to be limiting, and any device enabling implementation of the present embodiment is applicable. The printing apparatus 102 is used as an example of the device configured to use the information processing apparatus to perform network setting in the present embodiment. However, any device enabling implementation of the present embodiment is applicable.

The present disclosure is applicable to the case of performing network setting for various devices configured so that wireless communication based on the 802.11 standards can be performed. For example, the present disclosure is applicable to network setting for electric appliances such as a television set, a refrigerator, a camera, and a speaker. The present disclosure is also applicable to performing network setting for other devices such as a wristband for health management, a lighting equipment controllable via a network, etc.

<Information Processing Apparatus>

Figure 2:
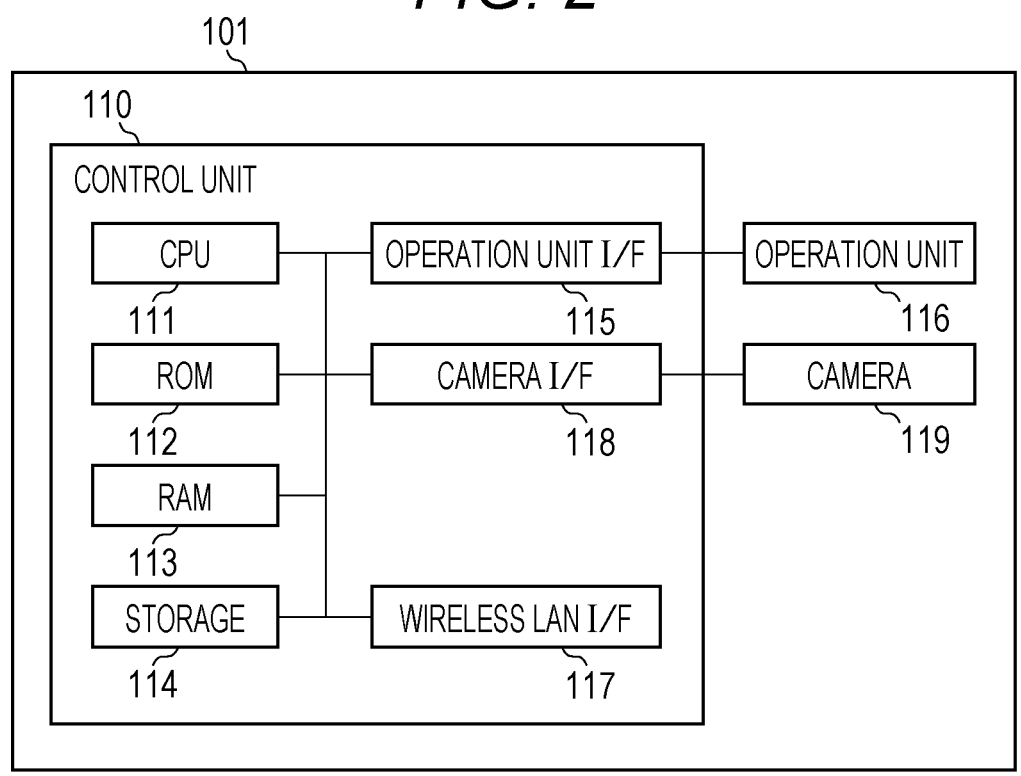
FIG. 2 is a diagram of an example of a hardware configuration of an information processing apparatus.

A hardware configuration of the information processing apparatus 101 will now be described with reference to FIG. 2.

A central processing unit (CPU) 111 included in a control section 110 is configured to read a control program stored in a read only memory (ROM) 112 or a storage 114, thereby controlling the information processing apparatus 101.

The control section 110 includes the CPU 111, the ROM 112, a RAM 113, the storage 114, a wireless LAN interface (I/F) 117, an operation section I/F 115, and a camera I/F 118, which are all connected to a bus.

The CPU 111 is a central processing unit (a processor) configured to control operation of the control section 110. The random access memory (RAM) 113 is a volatile memory, and is used as a temporal storage area for developing various control programs stored in a work area, the ROM 112, and the storage 114.

The ROM 112 is a nonvolatile memory, and is configured to store, for example, a boot program of the information processing apparatus. The storage 114 is a nonvolatile flash memory with a greater storage capacity compared to the RAM 113. The storage 114 stores the control program of the information processing apparatus 101. A below-described operating system (OS) 310 and a below-described application 300 are also stored in the storage 114.

The CPU 111 executes the boot program stored in the ROM 112 upon start-up of the information processing apparatus. This boot program is for reading a program of the OS 310 stored in the storage 114 and developing such a program on the RAM 113. When executing the boot program, the CPU 111 subsequently executes the program of the OS 310 developed on the RAM 113, thereby controlling the information processing apparatus. The CPU 111 also stores, in the RAM 113, data used for operation by the control program, thereby performing reading and writing of such data.

The information processing apparatus 101 is configured such that the single CPU 111 executes each type of processing illustrated in the below-described flowcharts, but can have other modes. For example, the information processing apparatus 101 can be configured such that a plurality of CPUs or microprocessors (MPU) cooperate with each other to execute each type of processing illustrated in the later-described flowcharts. Alternatively, part of the below-described processing can be executed using a hardware circuit such as an application specific integrated circuit (ASIC) or a field-programmable gate array (FPGA).

The operation section I/F 115 is configured to connect an operation section 116 and the control section 110 together. The operation section 116 includes a touch panel configured so that touch operation of a user is detectable, and a display panel configured to display various screens. The operation section 116 functions as a display section configured to display information or a receiving section configured to receive a user's instruction. Various screens provided by the OS 310 and the application 300 are displayed on the operation section 116. The user can use an object, such as a finger, to perform the touch operation on the operation section 116, thereby inputting a desired operating instruction to the information processing apparatus 101. The operation section 116 also includes a hardware key. The user can press the hardware key to input the operating instruction to the information processing apparatus 101.

The camera I/F 118 is configured to connect the control section 110 and a camera 119 together. The camera 119 is configured to perform imaging according to a user's imaging instruction. A picture acquired by the camera 119 is stored in a predetermined region of the storage 114.

The wireless LAN I/F 117 provides a function of a wireless client for performing wireless communication based on the 802.11 standards. The wireless LAN I/F 117 is connected to an external AP to execute wireless communication via Wi-Fi®. The external AP can be the printing apparatus 102 operating in the access point mode or the AP 103. In the present embodiment, the wireless LAN I/F 117 can be connected to an AP complying with the IEEE 802.11 standards.

Figure 3:
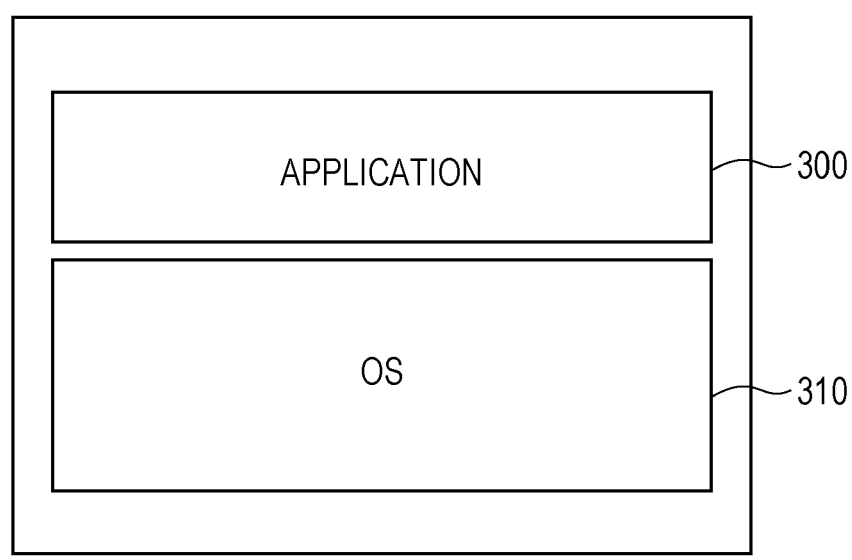
FIG. 3 is a diagram of an example of a software configuration of the information processing apparatus.

A software configuration of the information processing apparatus 101 will now be described with reference to FIG. 3. FIG. 3 is a functional block diagram of software implemented in such a manner that the control program stored in the ROM 112 or the storage 114 is read by the CPU 111.

The OS 310 is basic software for controlling operation of the information processing apparatus 101. Various applications including the below-described application 300 are installable in the information processing apparatus 101. The OS 310 can exchange information among these applications, thereby changing a screen displayed on a control panel 205 according to instructions received from the applications. According to the instructions received from the applications, wireless communication by the wireless LAN I/F 117 is controlled. Upon connection to an AP by the wireless LAN I/F 117, the OS 310 stores, as the history of wireless communication, information on the AP in the storage 114. The user can check the AP information on a wireless setting screen (not shown) provided by the OS 310.

The below-described application 300 enables the OS to invoke a function provided as an application program interface (API) or a framework for application, thereby acquiring the AP information. The below-described application 300 enables the OS to invoke the function provided as the API or the framework for application, thereby controlling the wireless LAN I/F 117 to search peripheral APs.

The application 300 is an application installed in the information processing apparatus 101. Although not shown in FIG. 3, applications for various purposes are, in addition to the application 300, installable in the information processing apparatus 101. The application 300 provides, to the user of the information processing apparatus 101, a function for performing network setting for a printing apparatus located in the vicinity of the information processing apparatus 101. The application 300 also provides a printing function for printing by the printing apparatus for which network setting has been performed.

<Printing Apparatus>

Figure 4:
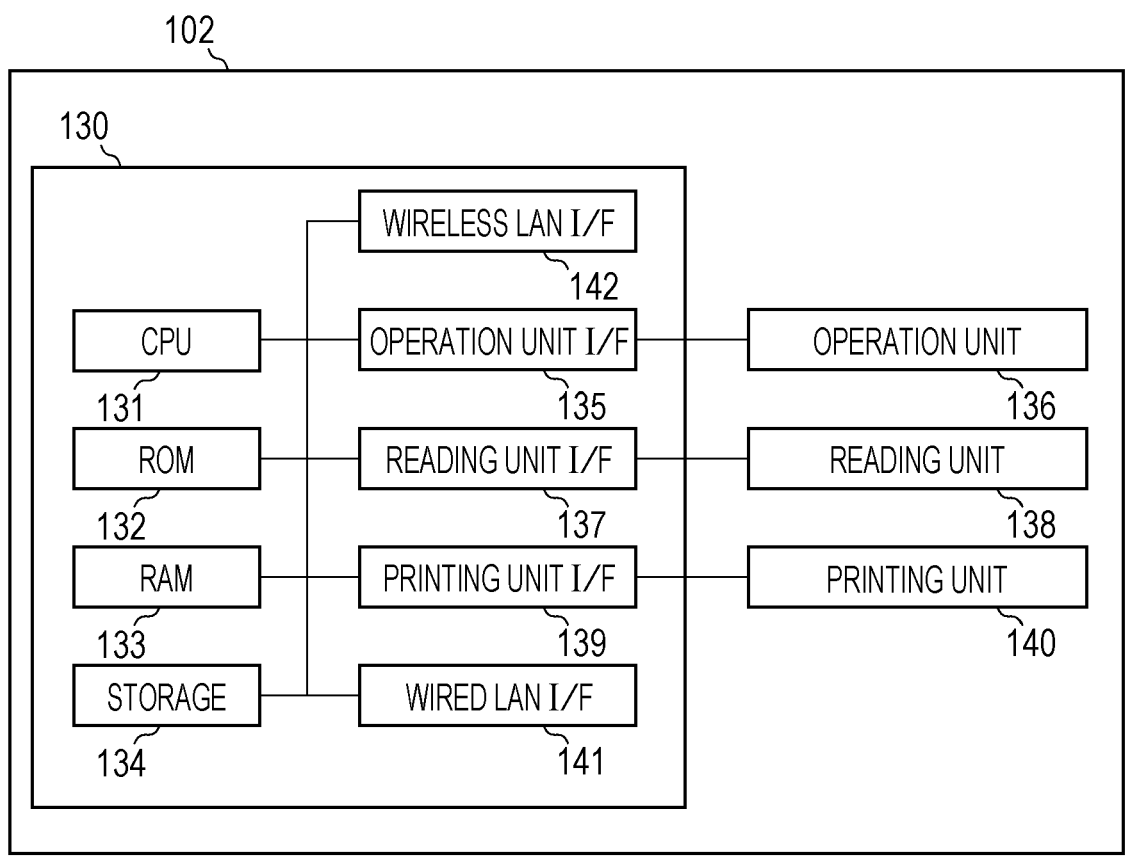
FIG. 4 is a diagram of an example of a hardware configuration of a printing apparatus.

The printing apparatus 102 will now be described. FIG. 4 is a block diagram of a hardware configuration of the printing apparatus 102. The printing apparatus 102 includes a reading function for reading an image and the printing function for printing the image on a sheet.

A control section 130 including a CPU 131 is configured to control operation of the printing apparatus 102. The CPU 131 is configured to read a control program stored in a ROM 132 or a storage 134, thereby performing various types of control such as printing control and reading control. The ROM 132 is configured to store the control program executable by the CPU 111. A RAM 133 is a main storage memory of the CPU 131, and is used as a work area or a temporal storage area for developing commands of various control programs. The storage 134 is configured to store print data, image data, various programs, and various types of setting information.

In the printing apparatus 102 of the present embodiment, the single CPU 131 uses a single memory (the RAM 133) to execute each type of processing illustrated in the below-described flowcharts, but the printing apparatus 102 can have other modes. For example, a plurality of CPUs, RAMs, ROMs, and storages can cooperate with each other to execute each type of processing illustrated in the below-described flowcharts.

An operation section I/F 135 is configured to connect an operation section 136 and the control section 130 together. The operation section 136 includes a liquid crystal display section including a touch panel function and various hardware keys. The operation section 136 functions as a display section configured to display information or a receiving section configured to receive a user's instruction.

A reading section I/F 137 is configured to connect a reading section 138 and the control section 130 together. The reading section 138 is configured to read a document to generate a read image. The generated read image is transmitted to the information processing apparatus or is used for printing.

A printing section I/F 139 is configured to connect a printing section 140 and the control section 130 together. The printing section 140 is configured to print an image on a sheet based on received print data.

The control section 130 is connected to a not-shown network via a wired LAN I/F 141. The wired LAN I/F 141 is configured to transmit an image or information to the information processing apparatus 101 on the not-shown network and to receive print data or information from the information processing apparatus 101 on a LAN 100.

The control section 130 includes a wireless LAN I/F 142. The wireless LAN I/F 142 is connected to the external AP 103 to provide the function of the wireless client for performing wireless communication and the function of the software AP for enabling the information processing apparatus 101 to act as an AP.

When the ESSID and the security key for connection to the AP 103 are set as the wireless network settings for the printing apparatus 102, the printing apparatus 102 can perform wireless communication via the AP 103.

The software AP is activated in a case where the access point mode is ON. In a case where the user sets the access point mode to ON, the wireless LAN I/F 142 activates the software AP, and an external apparatus operates as a connectable AP. The ESSID and the security key for connection to the software AP are displayed on the operation section 136 of the printing apparatus 102 according to user operation.

FIG. 5 illustrates examples of screens displayed on the operation section 136 of the printing apparatus 102. The user can display, via a not-shown setting screen, a setting screen 501 regarding a wireless LAN.

Setting for the wireless LAN I/F 142 can be performed on the setting screen 501. A "MANUAL SETTING" key 502 is used in a case where setting for the external AP 103 to be connected to the printing apparatus 102 is manually performed. The user can select the "MANUAL SETTING" key 502, thereby performing wireless network setting of the printing apparatus 102 via a not-shown input screen. In this case, the user inputs, via the not-shown input screen, an ESSID and a security key for an AP that needs to be connected to the printing apparatus 102, thereby manually performing wireless network setting.

The printing apparatus 102 of the present embodiment, in order to easily perform wireless network setting, includes a cooperation function for performing wireless LAN setting from a mobile terminal. A user wanting to use the cooperation function, selects a "SETTING USING MOBILE TERMINAL" key 503, thereby launching the software AP for use of the cooperation function.

When determining that the "SETTING USING MOBILE TERMINAL" key 503 has been selected, the CPU 131 of the printing apparatus 102 sets the access point mode to ON, thereby activating the software AP. The CPU 131 displays a screen 504 for checking the ESSID and the security key for connection to the software AP. An ESSID, an authentication method, and a security key are displayed on the screen 504 as information necessary for connection to the software AP from other terminals. A QR code® 505 can be displayed. The QR code® stores information on the ESSID, the authentication method, and the security key. The user uses the camera of the information processing apparatus 101 to read the QR code® 505 so that the information necessary for connection to the software AP is acquired by the information processing apparatus 101.

In the present embodiment, the case where the user operates the operation section 136 to launch the software AP has been described as an example, but this is not seen to be limiting. The software AP of the printing apparatus 102 can be kept activate. In the present embodiment, the case where the software AP requiring authentication using the security key is activated has been described as an example, but this is not seen to be limiting. The printing apparatus 102 can activate the software AP not requiring authentication.

<Network Setting Using Application 300>

The function of the information processing apparatus 101 of the present embodiment for performing network setting of a nearby printing apparatus will now be described.

Typically, it has been known that in the case of performing wireless network setting, peripheral APs are searched, and the list of APs found by such searching is displayed. A user can select, from the displayed APs, an AP that the user wishes to use in wireless communication, thereby performing wireless network setting.

The information processing apparatus 101 and the printing apparatus 102 search for nearby APs by receiving beacon signals transmitted from peripheral APs. The method for searching APs by receiving beacon signals transmitted from peripheral APs is hereinafter referred to as "passive scanning."

The IEEE 802.11 standards define a stealth function for intentionally avoiding transmission of a beacon signal so that an ESSID cannot be easily detected by nearby devices. An AP whose stealth function is set to valid does not voluntarily transmit a beacon signal. Thus, even when the information processing apparatus 101 and the printing apparatus 102 search for nearby APs by passive scanning, APs whose stealth function is valid cannot be found.

In typical AP searching using passive scanning, when the user wishes to set as a device connection destination, such as the printing apparatus 102, an AP whose stealth function is valid, Aps whose stealth function is set to valid cannot be displayed as a connection destination candidate.

In a case where the user attempts to connect a device, such as the printing apparatus 102, to a wireless network, it is typically because the user wishes to have the device participate in a network provided by an AP usually used by the user. Thus, in the case where the user wishes to set, as the device connection destination, the AP with the valid stealth function, there is a high probability that the user's information processing apparatus 101 previously connected to the AP with the valid stealth function set.

The information processing apparatus of the present embodiment is configured to perform, in device wireless network setting, control of selectively displaying APs previously connected to the information processing apparatus. The control executed by the information processing apparatus will now be described.

First, details of screens provided to the user by the application 300 and network setting for the nearby printing apparatus (printing apparatus 102) using the application 300 will be described with reference to FIGS. 6A and 6B.

Figure 6A:
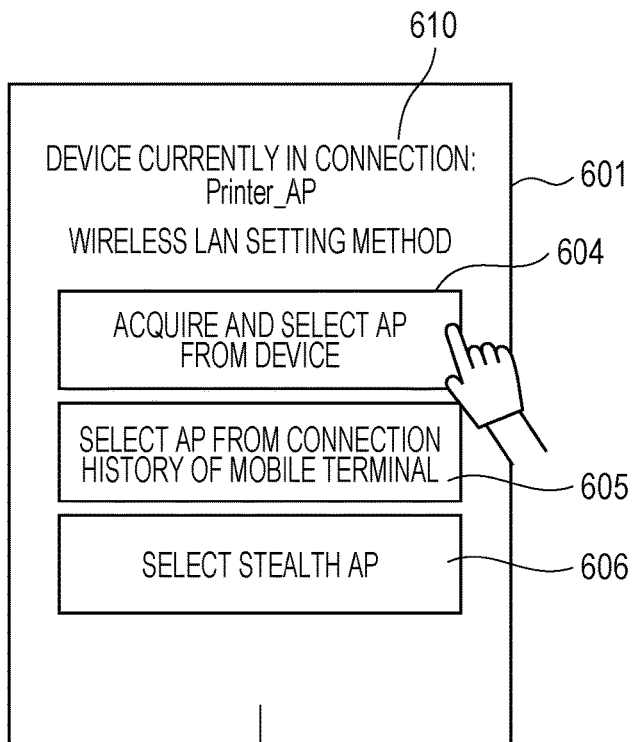
FIGS. 6A and 6B are views for describing examples of screens provided to a user by an application.
Figure 6B:
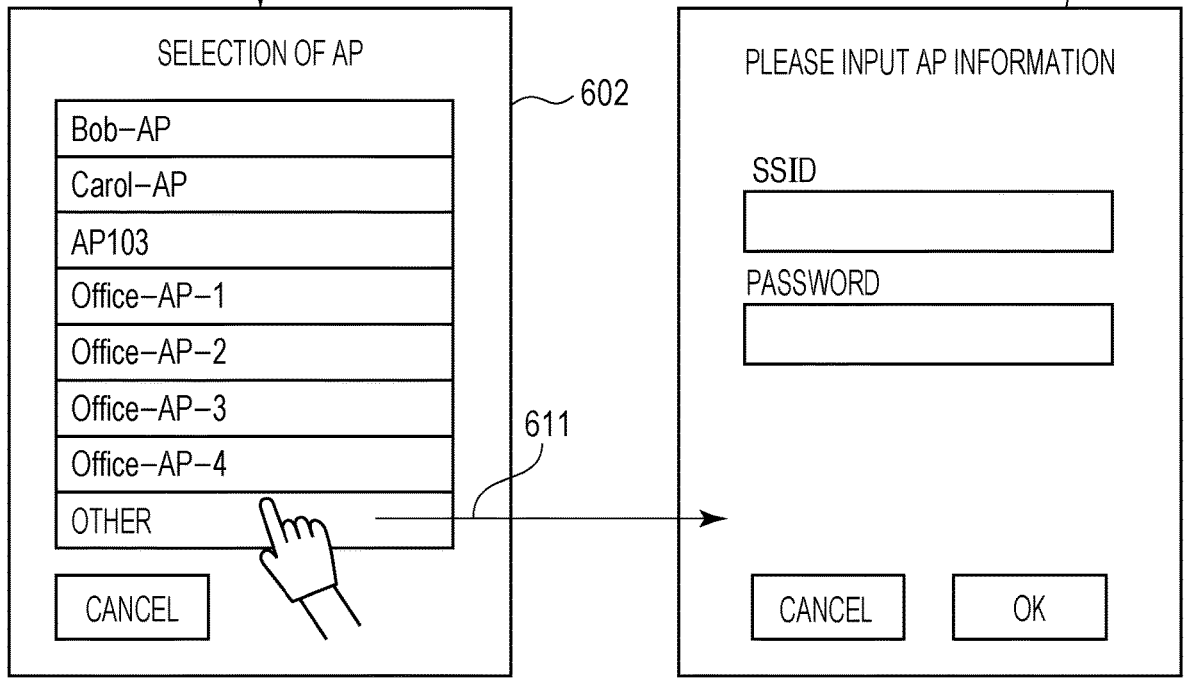

Each screen illustrated in FIGS. 6A and 6B is a screen provided to the user by the application 300, and is illustrated as an example of a screen displayed on the operation section 116.

When the application 300 is activated, the application 300 requests the OS 310 to display a not-shown TOP screen, and the OS 310 displays the TOP screen on the operation section 116. The user, via the TOP screen, selects the software AP provided by the nearby printing apparatus 102, thereby wirelessly connecting the information processing apparatus 101 to the software AP provided by the nearby printing apparatus 102. In the present embodiment, the case of wireless connection to the software AP provided by the printing apparatus 102 via the application 300 has been described as an example, but this is not seen to be limiting. For example, the user can wirelessly connect, via a wireless connection setting screen (not shown) provided by the OS 310, the information processing apparatus 101 to the software AP provided by the printing apparatus 102 in advance. Alternatively, the application 300 can launch the wireless connection setting screen provided by the OS 310, thereby performing wireless connection via such a screen. In this case, the OS 310 rejects the wireless connection setting screen according to the user's operation of closing the wireless connection setting screen, and transitions to the screen provided by the application 300.

Screen 601 of FIG. 6A is an example of a screen displayed in a case where the user has been able to establish wireless connection to the software AP of the printing apparatus 102 via the TOP screen. The screen 601 displays, as information 610, an AP name (Printer_AP) of the currently connected printing apparatus 102. The application 300 can perform, via the screen 601, network setting for the connected printing apparatus 102. The user uses any of keys 604 to 606 to perform network setting for the selected printing apparatus 102.

The "ACQUIRE AND SELECT AP FROM DEVICE" key 604 is used in a case where, for performing wireless network setting for the printing apparatus 102, the list of connection destination candidates is acquired from the connected printing apparatus 102 and is selectively displayed. The "SELECT AP FROM CONNECTION HISTORY OF MOBILE TERMINAL" key 605 is used in a case where for performing wireless network setting for the printing apparatus 102, APs previously connected to the information processing apparatus 101 are selectively displayed. The "SELECT STEALTH AP" key 606 is used in a case where for performing wireless network setting for the printing apparatus 102, APs having previously connected to the information processing apparatus 101 and with the stealth function set to valid are selectively displayed. The connection destination candidates displayed when the user presses keys 604 to 606 will be described below with reference to the below-described flowcharts.

When determining that the user has selected any of the above-described keys, the application 300 of the information processing apparatus requests the OS 310 to display, on the operation section 116, a screen 602 for selecting an AP as the connection destination candidate as exemplified in FIG. 6B. The screen 602 is displayed on the operation section 116.

The user can select, via the screen 602, the AP that needs to be connected to the printing apparatus 102, and information on such an AP can be transmitted to the connected printing apparatus 102. The information processing apparatus 101 uses wireless communication via the software AP provided by the printing apparatus 102 to transmit the AP information to the printing apparatus 102.

In addition to the APs as the connection destination candidates, "OTHER" is displayed as a selectable item (an option) on the screen 602. When the user selects the item "OTHER," the information processing apparatus 101 displays a screen 603 enabling the user to input the AP information. The user can manually input, via the screen 603, the information on the AP that needs to be connected to the printing apparatus 102.

The control of setting an AP as the connection destination of the printing apparatus 102 by the information processing apparatus 101 will be described with reference to the flowcharts of FIGS. 7 to 9 and FIG. 10A. More specifically, FIGS. 7 to 9 and FIG. 10A are flowcharts describing the control associated with the application 300. Each type of operation (each step) illustrated in the flowcharts of FIGS. 7 to 9 and FIG. 10A is implemented in such a manner that the CPU 111 reads and executes, in the RAM 113, the program for implementing each control module, the program being stored in the ROM 112 or the storage 114. The processing illustrated in the flowcharts is implemented by cooperation of the OS 310 as the control program and the application 300 as an application program.

The environment near the information processing apparatus 101 for describing the control is provided for discussion/example purposes. The software AP has been already activated by the printing apparatus 102. Moreover, settings illustrated in Table 1 are made as settings for the software AP provided by the printing apparatus 102.

TABLE 1

| ESSID | PASSWORD | AUTHENTICATION METHOD | STEALTH FUNCTION |
|---|---|---|---|
| Printer AP | A1234567 | WPA2 PERSONAL MODE | OFF |

AP 103 operates with settings illustrated in Table 2. A case where the user wishes to set the AP 103 as the wireless network connection destination of the printing apparatus 102 will be described as an example.

TABLE 2

| ESSID | PASSWORD | AUTHENTICATION METHOD | STEALTH FUNCTION |
|---|---|---|---|
| AP103 | B1234567 | WPA2 PERSONAL MODE | ON |

While not illustrated in FIG. 1, a plurality of APs with settings illustrated in Table 3 operate around the information processing apparatus 101. These APs include portable APs (e.g., mobile routers such as Alice-AP, Bob-AP, and Carol-AP) owned by individuals. Other APs can also be in operation.

TABLE 3

| ESSID | PASSWORD | AUTHENTICATION METHOD | STEALTH FUNCTION |
|---|---|---|---|
| Printer AP | A1234567 | WPA2 PERSONAL MODE | OFF |
| AP103 | B1234567 | WPA2 PERSONAL MODE | ON |
| Alice-AP | C1234567 | WEP | OFF |
| Bob-AP | D1234567 | WPA | OFF |
| Carol-AP | E1234567 | WPA2 PERSONAL MODE | OFF |
| Office-AP-1 | F1234567 | WPA2 PERSONAL MODE | OFF |
| Office-AP-2 | G1234567 | WPA2 ENTERPRISE MODE | OFF |
| Office-AP-3 | H1234567 | WEP | ON |
| Office-Ap-4 | J1234567 | WPA2 ENTERPRISE MODE | ON |

Figure 7:
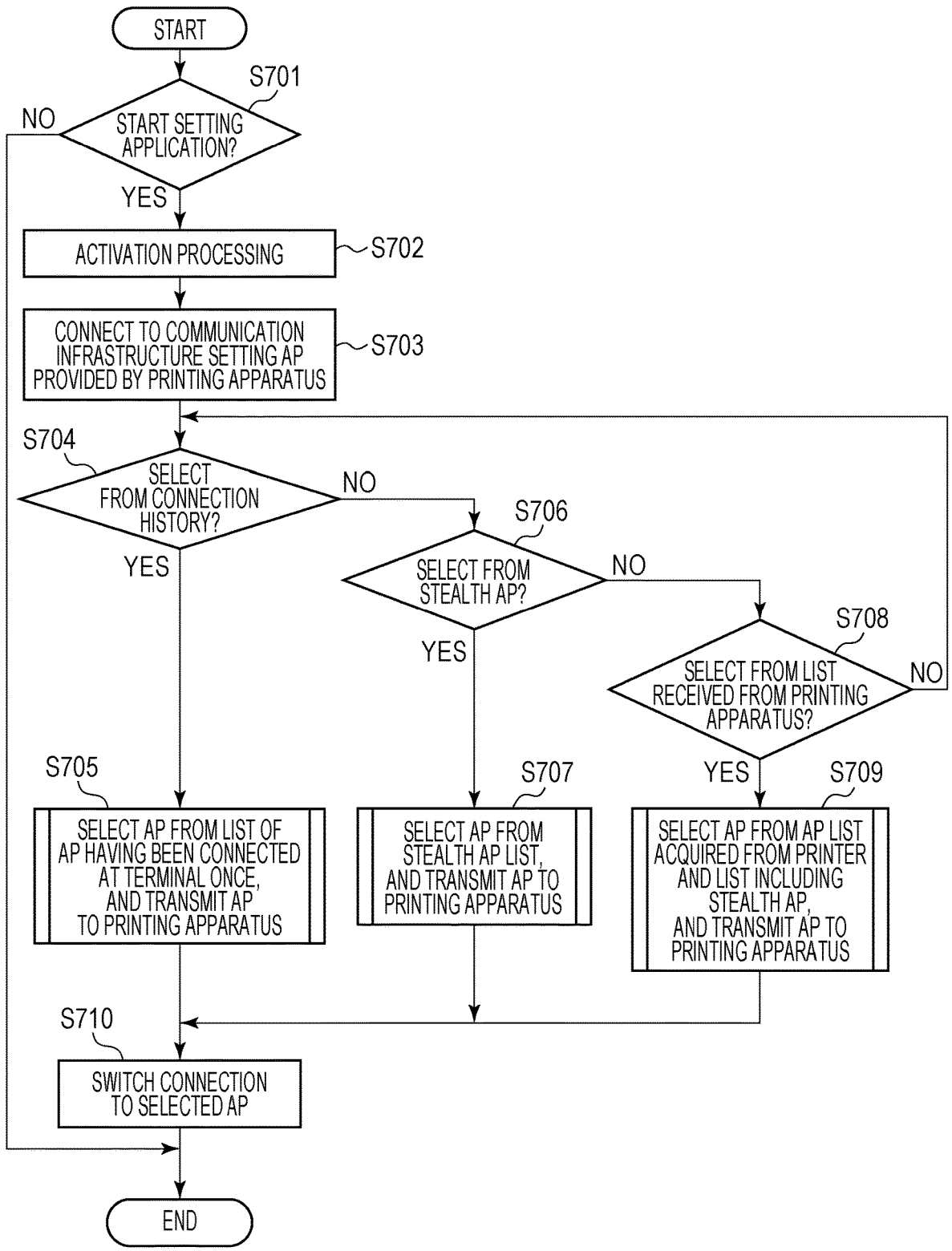
FIG. 7 is a flowchart of an example of control by the information processing apparatus.

Turning to FIG. 7, in S701, the CPU 111 determines whether the instruction of activating a setting application has been received. In a case where the instruction of activating the setting application is made from a not-shown home screen or a launcher screen for activating the application, the CPU 111 determines that the instruction of activating the setting application has been received, and the processing proceeds to S702. In a case where the instruction of activating the setting application is not made from the not-shown home screen or the launcher screen for activating the application, the CPU 111 determines that the instruction of activating the setting application has not been received, and the processing ends.

In S702, the CPU 111 activates the application 300 to display an initial screen of the application.

In S703, the CPU 111 receives user operation via the screen, and is then connected to the software AP for communication infrastructure setting, the software AP being provided by the printing apparatus 102. In the present embodiment, the case of connecting to the software AP via the screen provided by the application 300 has been described as an example, but this is not seen to be limiting. Before the application 300 is activated in S701, connection to the software AP for communication infrastructure setting can be made via a wireless setting screen provided by the OS 310, the software AP being provided by the printing apparatus 102 in advance. In this case, the CPU 111 uses the name of the AP connected to the information processing apparatus 101, thereby determining whether the AP in connection is the software AP for communication infrastructure setting. As a result of the determination, in a case where the AP in connection is the software AP for communication infrastructure setting, the processing of S703 can be skipped such that the processing after S704 is performed.

In S704, the CPU 111 determines whether an instruction for selection from a connection history is made. In a case where the "SELECT AP FROM CONNECTION HISTORY OF MOBILE TERMINAL" key 605 is selected, it is determined that the instruction for selection from the connection history has been made, and the processing proceeds to S705. In a case where the key 605 is not selected, it is determined that the instruction for selection from the connection history has not been made, and the processing proceeds to S706.

In S705, the CPU 111 performs processing enabling the user to select an AP from the list of APs having previously connected to the information processing apparatus 101, thereby transmitting information on a selected AP to the printing apparatus 102. The processing will be described below.

In S706, the CPU 111 determines whether an instruction for selection from stealth APs has been made. In a case where the "SELECT STEALTH AP" key 606 is selected, the processing proceeds to S707. In a case where the "SELECT STEALTH AP" key 606 is not selected, the processing proceeds to S708.

In S707, the CPU 111 performs the processing for enabling the user to select an AP from the list of APs whose stealth function is set to valid, thereby transmitting information on such an AP to the printing apparatus 102. This processing is described below.

In S708, the CPU 111 determines whether an instruction for selection from the list received from the printing apparatus 102 has been made. In a case where the "ACQUIRE AND SELECT AP FROM DEVICE" key 604 is selected, it is determined that the instruction for selection from the list received from the printing apparatus 102 has been made, and the processing proceeds to S709. In a case where the key 604 is not selected, it is determined that the instruction for selection from the list received from the printing apparatus 102 has not been made, and the processing returns to S704.

In S709, the CPU 111 performs processing for enabling the user to select an AP from the AP list acquired from the printing apparatus 102 and the list of APs whose stealth function is set to valid, thereby transmitting information on such an AP to the printing apparatus 102. This processing is described below.

In S710, connection is switched, by the CPU 111, to connection to the AP selected by any of the processing of S705, S707, and S709. The application 300 invokes, using the OS 310, the function provided as the API or the framework, and then updates network settings for the wireless LAN I/F 117 based on the AP information.

The processing of S710 brings a state in which the information processing apparatus 101 and the printing apparatus 102 can perform the infrastructure wireless communication via the same AP according to the success of wireless network setting on the printing apparatus 102 side. That is, the processing of S710 is processing for bringing a state in which information can be exchanged between the printing apparatus 102 and the information processing apparatus 101.

Figure 8:
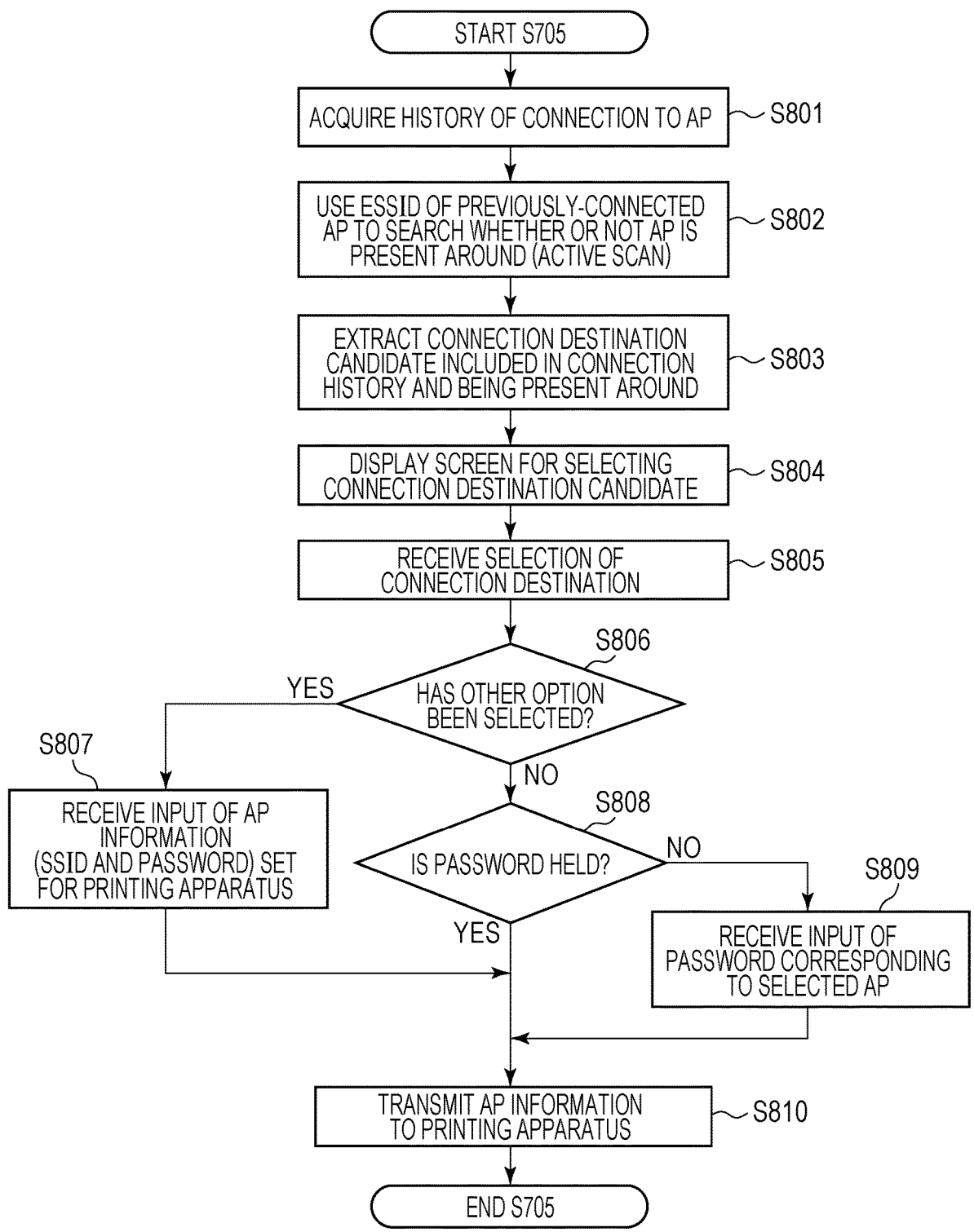
FIG. 8 is a flowchart of the example of control by the information processing apparatus.

Next, the processing of S705 will be described with reference to FIG. 8. The processing of FIG. 8 is processing mainly executed by the application 300 executed by the CPU 111. In S801, the application 300 utilizes the function provided as the API or the framework by the OS 310 to acquire AP connection history information managed by the OS 310.

Suppose that the ESSID, the password, the authentication method, and ON or OFF of the stealth function for each AP illustrated in Table 4 are recorded as the AP connection history information managed by the OS 310. The connection history information is history information acquired while connection to an AP previously connected to the information processing apparatus 101 is being established.

Thus, information on APs not placed in the vicinity of the information processing apparatus 101 is currently included. For example, the connection history information includes information on an AP (e.g., MyHome-Ap) of a home network and an AP (e.g., CAFE-AP) previously connected at a store such as a cafe.

TABLE 4

| ESSID | PASSWORD | AUTHENTICATION METHOD | STEALTH FUNCTION |
| --- | --- | --- | --- |
| Printer AP | A1234567 | WPA2 PERSONAL MODE | OFF |
| AP103 | B1234567 | WPA2 PERSONAL MODE | ON |
| Office-AP-1 | F1234567 | WPA2 PERSONAL MODE | OFF |
| Office-AP-2 | G1234567 | WPA2 ENTERPRISE MODE | OFF |
| Office-AP-3 | H1234567 | WEP | ON |
| Office-Ap-4 | J1234567 | WPA2 ENTERPRISE MODE | ON |
| MyHome-AP | K1234567 | WPA2 PERSONAL MODE | OFF |
| CAFÉ-AP | L1234567 | WPA2 PERSONAL MODE | OFF |

In S802, the application 300 uses the ESSIDs of the previously-connected APs, thereby searching whether such APs are nearby. The application 300 uses the function provided as the API or the framework by the OS 310, thereby performing active scanning based on the ESSIDs. Active scanning is an AP searching method performed in such a manner that a client terminal broadcasts, for peripheral APs, a probe request including an ESSID. An AP receiving the probe request replies with a probe response in a case where the ESSID included in the probe request coincides with the ESSID of the AP itself.

In a case where the probe response is received, the client terminal determines that the AP set with the above-described ESSID is nearby.

Even if an AP's stealth function is set to ON and cannot be found by passive scanning, it can be, by active scanning, checked whether such an AP is located in the vicinity of the client terminal.

Based on the AP connection history acquired in S801, the application 300 proceeds the processing to S803 based on completion of searching for all of the previously-connected APs, the searching conducted to check whether these APs are nearby.

In S803, based on a search result of S802, the application 300 extracts, as connection destination candidates, APs included in a previous connection history and located in the vicinity of the information processing apparatus 101. When extracting the connection destination candidates, the application 300 does not extract, as the connection destination candidates, an AP in connection with the information processing apparatus 101. This avoids, for wireless network setting of the printing apparatus 102, setting of the software AP activated by the printing apparatus 102 itself.

By the extraction processing of S803, only APs in the vicinity of the information processing apparatus 101, as illustrated in Table 5, can be extracted as the connection destination candidates from the AP connection history exemplified in Table 4. In this case, MyHome-AP, CAFE-AP, and PrinterAP are excluded.

TABLE 5

| ESSID | PASSWORD | AUTHENTICATION METHOD | STEALTH FUNCTION |
| --- | --- | --- | --- |
| AP103 | B1234567 | WPA2 PERSONAL MODE | ON |
| Office-AP-1 | F1234567 | WPA2 PERSONAL MODE | OFF |
| Office-AP-2 | G1234567 | WPA2 ENTERPRISE MODE | OFF |
| Office-AP-3 | H1234567 | WEP | ON |
| Office-Ap-4 | J1234567 | WPA2 ENTERPRISE MODE | ON |

In S804, the application 300 displays, on the operation section 116, a screen for selecting the connection destination extracted in S803. An item "OTHER", as exemplified in FIG. 6B, is selectively displayed on the screen displayed in S804.

In S805, the application 300 receives selection of a connection destination via the screen displayed in S804.

In S806, the application 300 determines whether "OTHER" has been selected in the selection processing of S805. In a case where "OTHER" is selected, the processing proceeds to S807. In a case where "OTHER" is not selected (i.e., a case where any of the APs displayed as the candidates are selected), the processing proceeds to S808.

In S807, the application 300 displays the input screen described as an example at 603 of FIGS. 6A and 6B, thereby receiving input of the AP information (the ESSID and the password) set for the printing apparatus 102. Upon completion of user input, the processing proceeds to S810.

In S808, the application 300 determines whether the password is held as the AP connection history information selected in S805. In a case where the password is held, the processing proceeds to S810. In a case where the password is not held, the processing proceeds to S809.

In S809, the application 300 displays a not-shown pop-up screen, thereby receiving input of the password to be used for connection to the selected AP. Upon completion of user input, the processing proceeds to S810.

In S810, the application 300 transmits the AP information to the printing apparatus 102 using wireless communication. The transmitted AP information, as described herein, includes ESSID and password of an AP that needs to be connected. Upon completion of transmission, the processing proceeds to S710.

The following effects are included in the above-described processing of "enabling the user to select an AP from the list of APs previously connected to the terminal, thereby transmitting information on the selected AP to the printing apparatus 102" in S705.

Based on the APs having been previously connected to the information processing apparatus 101, the connection destination candidates are displayed as wireless network settings of the printing apparatus 102. Thus, the user can select an AP from the list, the AP having been previously connected to the information processing apparatus 101 with the stealth function set to ON. With this configuration, even in a case where the user wishes to set an AP whose stealth function is set to ON, the user needing to manually inputting an ESSID and a password by is avoided. Thus, convenience of the user is enhanced.

In addition to AP information stored in a connection history of an information processing terminal being utilized, information on APs having been confirmed as being nearby is displayed on a UI. This enables preventing an event where APs that are not nearby are erroneously selected by the user.

An access point of a device itself can be excluded from access point candidates set for the device. This enables reducing a user's erroneous setting of a software AP provided as a wireless network setting of the device by the device itself.

Figure 9:
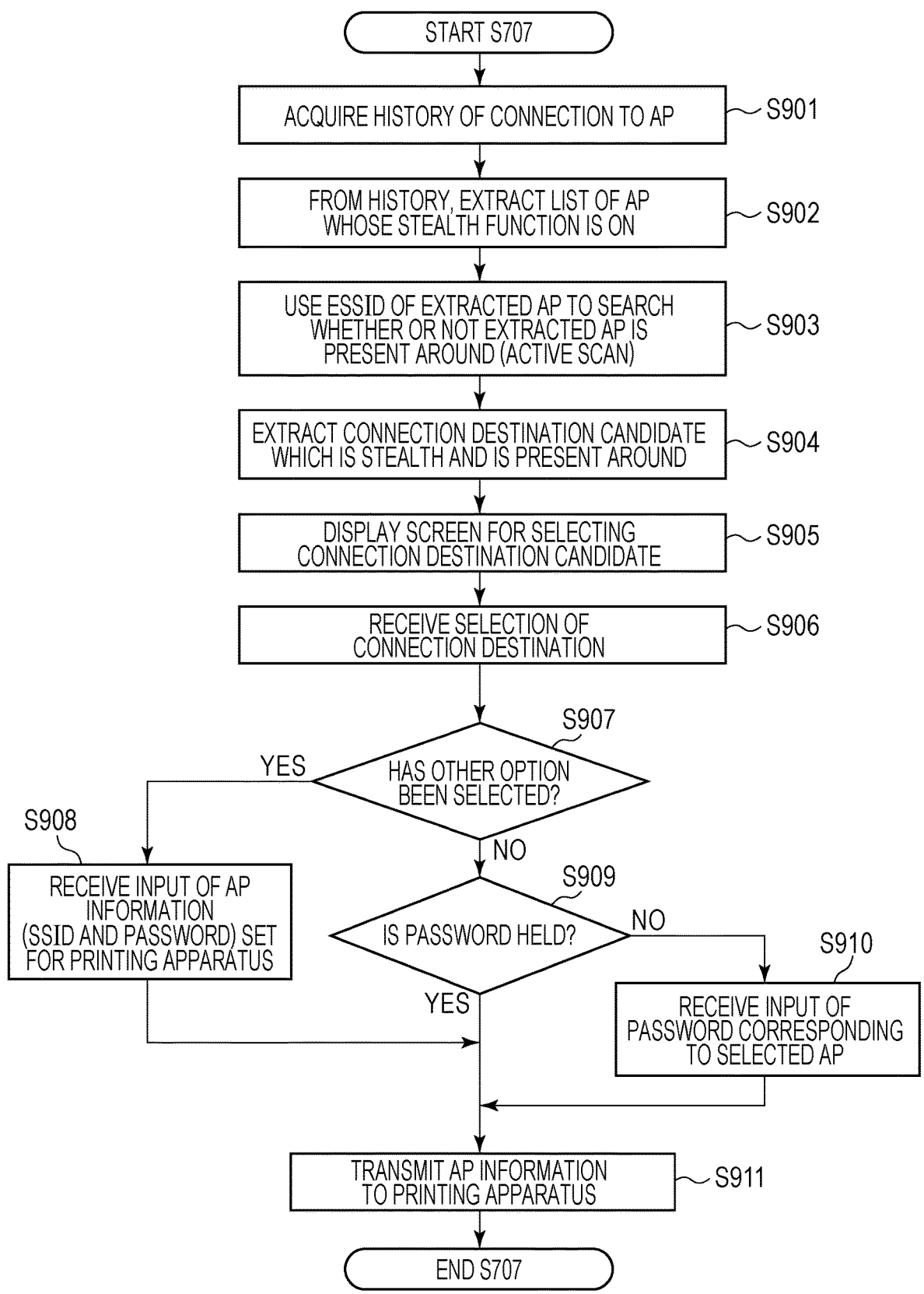
FIG. 9 is a flowchart of the example of control by the information processing apparatus.

The processing of S707 will now be described with reference to FIG. 9. The processing of FIG. 9 is processing mainly executed by the application 300 executed by the CPU 111. Steps similar to those of the processing of FIG. 8 are not described in detail.

S901 is similar to S801 in FIG. 8. In S902, the application 300 extracts, from the AP connection history information acquired in S901, APs whose stealth function is set to ON.

In the case of the AP connection history as illustrated in Table 4, the application 300 extracts, in the processing of S902, AP103, Office-AP-3, and Office-AP-4 as APs whose stealth function is set to ON.

In S903, the application 300 uses the ESSIDs of the APs extracted in cooperation with the OS 310 in S902, and searches whether the extracted APs are nearby. The searching method of S903 is similar to that described in S802, and therefore, description thereof will not be repeated.

In S904, based on a search result of S903, the application 300 extracts, as connection destination candidates, previously-connected APs with the stealth function set to ON and located in the vicinity of the information processing apparatus 101. When extracting the connection destination candidates, the application 300 does not extract, as the connection destination candidates, an AP currently in connection with the information processing apparatus 101.

Based on the extraction processing in S904, only APs located in the vicinity of the information processing apparatus 101 and with the valid stealth function can be extracted as the connection destination candidates, as illustrated in Table 6.

TABLE 6

| ESSID | PASSWORD | AUTHENTICATION METHOD | STEALTH FUNCTION |
|---|---|---|---|
| AP103 | B1234567 | WPA2 PERSONAL MODE | ON |
| Office-AP-3 | H1234567 | WEP | ON |
| Office-Ap-4 | J1234567 | WPA2 ENTERPRISE MODE | ON |

The processing of S905 to S911 is similar to that of S804 to S810 of FIG. 8, and therefore, description thereof will not be repeated.

The following effects are included in the above-described processing of "enabling the user to select an AP from the list of APs whose stealth function is set to valid, thereby transmitting information the selected AP to the printing apparatus 102" in S707.

In a case where the user wishes to utilize an AP with the valid stealth function, such as the AP 103, as a wireless network setting of the printing apparatus 102, only APs with the valid stealth function can be displayed. The connection destination candidates are displayed with these candidates being narrowed down to stealth APs. Thus, in a case where the user wishes to set a stealth AP, such an AP can be easily selected, leading to improved convenience.

Figures 10A, 10B:
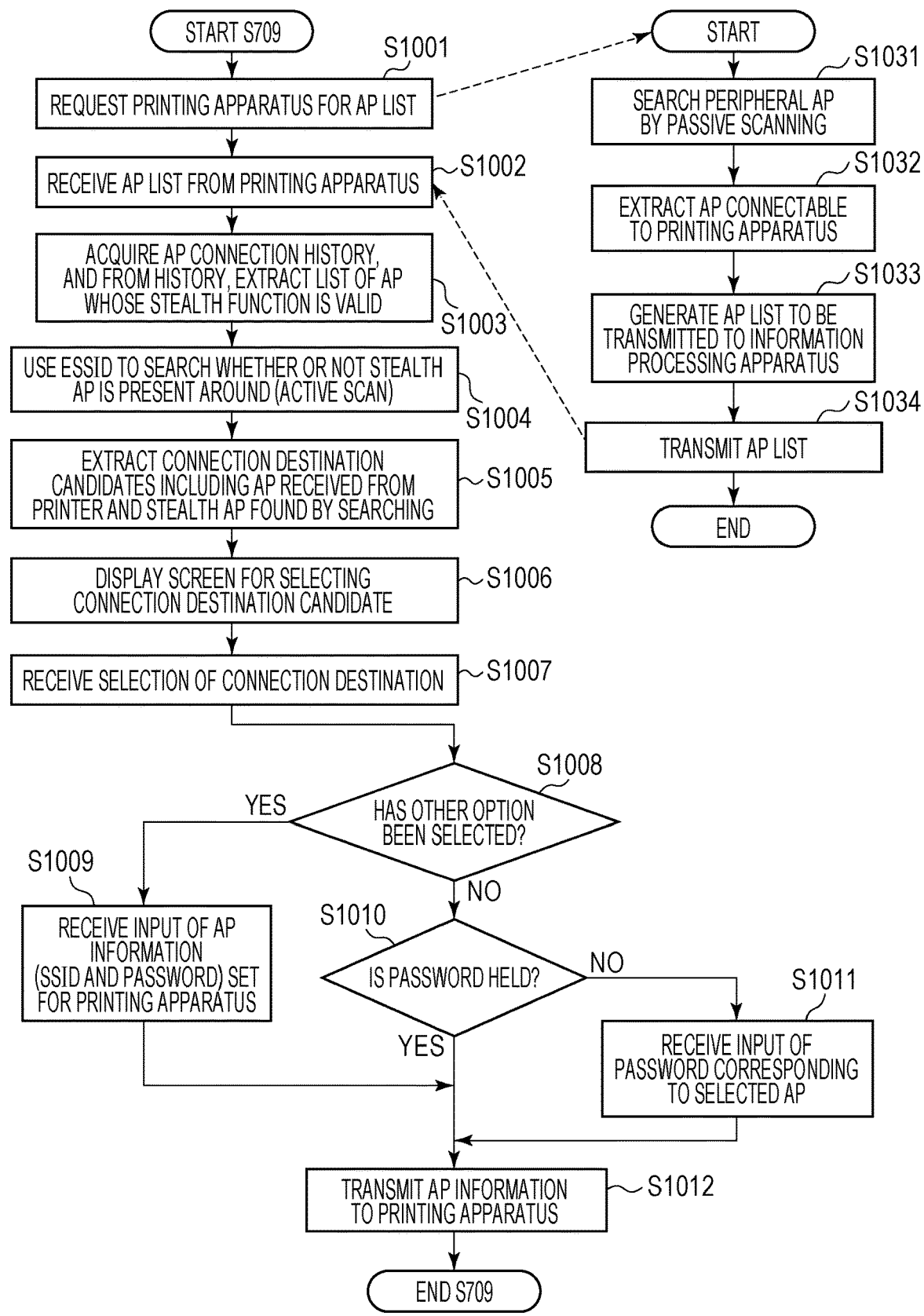
FIGS. 10A and 10B are flowcharts of the example of control by the information processing apparatus.

The processing of S709 will be described with reference to FIGS. 10A and 10B. The processing of FIG. 10A is processing mainly executed by the application 300 executed by the CPU 111. In the processing of FIGS. 10A and 10B, the application 300 performs wireless communication with the printing apparatus 102, thereby requesting the printing apparatus 102 for an AP list. The processing in the printing apparatus 102 will be described with reference to a flowchart of FIG. 10B. Each type of operation (each step) illustrated in the flowchart of FIG. 10B is implemented in such a manner that the CPU 131 of the printing apparatus 102 reads and executes, in the RAM 133, the control program stored in the ROM 132 or the storage 134.

In S1001, the application 300 transmits, to the printing apparatus 102, a packet for requesting the AP list.

Control in the printing apparatus 102 upon receipt of the packet for requesting the AP list will be described with reference to FIG. 10B.

In S1031, the CPU 131 cooperates with the wireless LAN I/F 142 to perform searching of peripheral APs by passive scanning. The CPU 131 receives beacon signals transmitted from the peripheral APs, thereby searching APs located in the vicinity of the printing apparatus 102.

In S1032, the CPU 131 checks information on the access points found by passive scanning, thereby extracting access points connectable to the CPU 131 itself. For example, when the printing apparatus 102 does not correspond to a Wi-Fi (registered trademark) protected access® (WPA) 2 enterprise mode, access points excluding APs set to the WPA2™ enterprise mode are extracted. Moreover, APs whose authentication method is wired equivalent privacy (WEP) and APs for which no authentication has been set have a low security strength, and therefore, access points excluding these APs are extracted.

In S1033, the CPU 131 generates, based on an extraction result of S1032, the list of APs connectable to the printing apparatus 102. The AP list illustrated in Table 7 is generated based on the generation processing of S1033. In the printing apparatus 102, searching by passive scanning is performed, and therefore, only APs whose stealth function is not valid (i.e., APs with the stealth function set to OFF) are extracted.

TABLE 7

| SSID | PASSWORD | AUTHENTICATION METHOD | STEALTH FUNCTION |
|---|---|---|---|
| Bob-AP | D1234567 | WPA | OFF |
| Carol-AP | E1234567 | WPA2 PERSONAL MODE | OFF |
| Office-AP-1 | F1234567 | WPA2 PERSONAL MODE | OFF |

In S1034, the CPU 131 transmits the list generated in 51333 to the information processing apparatus 101. The CPU 131 uses wireless communication to transmit the AP list to the connected information processing apparatus 101. The AP list can be transmitted in a comma-separated text data format such as comma-separated values (CSV), or can be transmitted in a data format such as an extensible markup language (XML).

Based on the above-described processing, The printing apparatus 102 receives the packet for requesting the AP list, searches nearby APs, and transmits, to the information processing apparatus 101, the list of extracted APs connectable to the printing apparatus 102 itself.

Returning FIG. 10A, the application 300 receives, in S1002, the AP list from the printing apparatus 102.

In S1003, the application 300 utilizes the function provided as the API or the framework by the OS 310, thereby acquiring the AP connection history information managed by the OS 310. The application 300 extracts the list of APs with the valid stealth function from the acquired history.

In S1004, the application 300 uses the ESSIDs of the APs extracted in cooperation with the OS 310 in S1003, thereby searching whether the extracted APs are nearby. The searching method of S1004 is similar to that described in S802, and therefore, description thereof will not be repeated.

In S1005, based on the list received in S1002 and a search result acquired in S1004, the application 300 extracts, as connection destination candidates, APs received from a printer and APs found with the valid stealth function by searching. When extracting the connection destination candidates, the application 300 does not extract, as the connection destination candidates, an AP currently in connection with the information processing apparatus 101.

In addition to the APs found as being connectable to the printing apparatus 102 by the extraction processing of S1005, APs located in the vicinity of the information processing apparatus 101 and with the valid stealth function can be extracted as the connection destination candidates. Thus, the connection destination candidates illustrated in Table 8 can be extracted based on the list of APs previously connected to information processing apparatus 101 as exemplified in Table 4 and the list of APs connectable to the printing apparatus 102 as exemplified in Table 7.

TABLE 8

| ESSID | PASSWORD | AUTHENTICATION METHOD | STEALTH FUNCTION |
|---|---|---|---|
| AP103 | B1234567 | WPA2 PERSONAL MODE | ON |
| Bob-AP | D1234567 | WPA | OFF |
| Carol-AP | E1234567 | WPA2 PERSONAL MODE | OFF |
| Office-AP-1 | F1234567 | WPA2 PERSONAL MODE | OFF |

The processing of S1006 to S1012 is similar to that of S804 to S810 of FIG. 8, and therefore, detailed description thereof will not be repeated.

The following effects are included in the above-described processing of "enabling the user to select an AP from the AP list acquired from the printing apparatus 102 and the list of APs whose stealth function is set to valid, thereby transmitting information on the selected AP to the printing apparatus 102" in S709. This reduces presentation, to the user, of information on APs not connectable to the printing apparatus 102 as the connection destination candidates, while APs connectable to the printing apparatus 102 and APs with the valid stealth function can be presented to the user.

Operation of the printing apparatus 102 having received the AP information transmitted in S705, S707, and S709 will now be described. When receiving the AP information from the information processing apparatus 101, the CPU 131 of the printing apparatus 102 performs connection to an AP based on the received AP information. In a case where connection to the AP is successful, information for connection to the AP is stored as a wireless network setting. In a case where connection to the AP is not successful, an error screen is displayed on the operation section 136, and the user is notified that connection was not successful.

<Variations>

In the embodiment described above, the case where wireless communication via the software AP provided by the printing apparatus 101 is utilized for communication between the information processing apparatus 101 and the printing apparatus 102 has been described as an example, but this is not seen to be limiting. For example, in another embodiment, the information processing apparatus 101 and the printing apparatus 102 communicate with each other using a cable such as a universal serial bus (USB).

Alternatively, the information processing apparatus 101 and the printing apparatus 102 can communicate with each other by way of Bluetooth® or near field wireless communication (NFC).

When extracting the connection destination candidates, the application 300 can perform sorting such that APs with the valid stealth function are displayed at the top of the list. Such processing enables the APs with the valid stealth function to be displayed on a priority basis. Thus, the user can more easily select the APs whose stealth function is set to valid.

In the above-described embodiment, the case where the user selects the setting method to subsequently start AP searching as illustrated in the screen 601 of FIG. 6A has been described as an example, but this is not seen to be limiting.

Figure 11A:
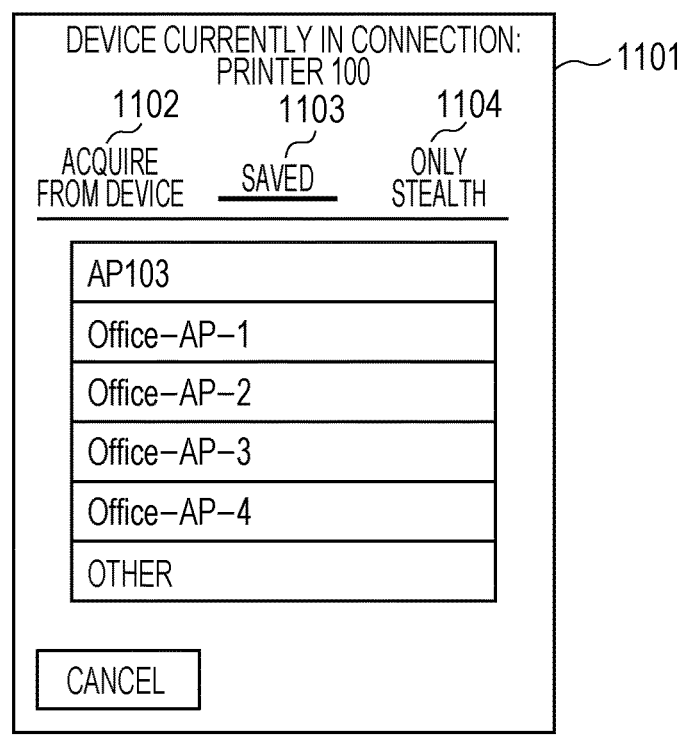
FIGS. 11A and 11B are views of a variation of the screens provided to the user by the application.
Figure 11B:
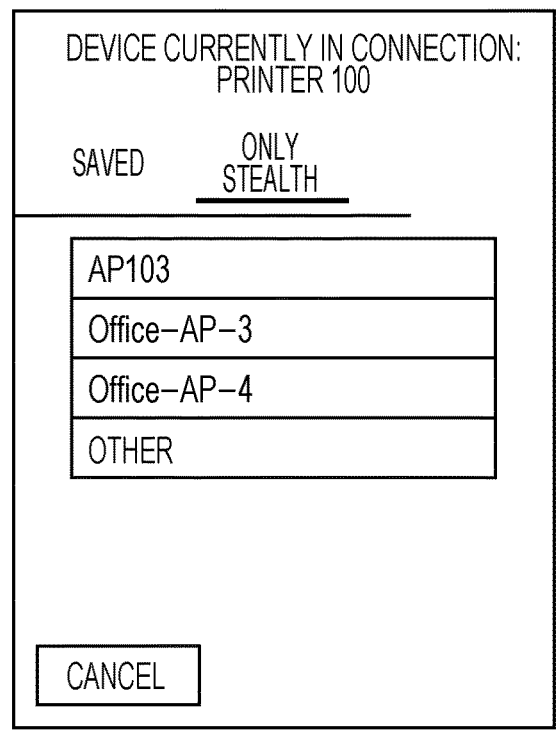

For example, the user can select an AP via a user interface as illustrated in FIGS. 11A and 11B. FIGS. 11A and 11B illustrate a variation of the screen provided to the user by the application 300 as an example of the screen displayed on the operation section 116.

The user can perform flick operation or touch operation to change over tabs 1102 to 1104. A flick operation is an operation of quickly tracing the touch panel of the operation section 116, such that a tip of a finger (or the tip of a stylus) is flicked across a section the touch panel. For example, the user traces, in the state of FIG. 11A, on the touch panel to the left side with the user touching the vicinity of the tab 1103. In this manner, the user can change the screen to the screen state of FIG. 11B.

The tab 1102 is a tab used in a case where the user wishes to display an AP corresponding to the key 604 of FIG. 6A. The tab 1103 is a tab used in a case where the user wishes to display an AP corresponding to the key 605 of FIG. 6A. The tab 1104 is a tab used in a case where the user wishes to display an AP corresponding to the key 606 of FIG. 6A.

In this case, the user performs the operation of changing over the tabs, thereby easily changing the method for displaying the AP. Thus, an intuitive and easily understandable wireless interface setting method can be provided to a user.

The case of displaying only APs based on the connection history has been described in S705 of the above-described embodiment, but an additional embodiment is provided as follows. In S705, the application 300 can display the connection destination candidates including APs based on the connection history and APs found by passive scanning. In this case, an AP not previously connected by the user and located in the vicinity of the information processing apparatus 101 can be also selected.

In a series of processing illustrated in S707 of the above-described embodiment, the case where the result of passive scanning is received by the printing apparatus 102 has been described. An additional embodiment is provided as follows. In S1001, the application 300 utilizes the function provided as the API or the interface by the OS 310, thereby acquiring the AP connection history. ESSIDs with the valid stealth function are extracted from the acquired connection history. The application 300 requests the AP list while transmitting the extracted ESSIDs.

The printing apparatus 102 upon receipt of the request for the AP list performs passive scanning of S1031, as well as performing active scanning for the ESSIDs received together with the request. The CPU 131 performs the processing after S1032 based on APs searched by active scanning and APs searched by passive scanning, thereby transmitting the list of APs connectable to the information processing apparatus 101.

The information processing apparatus 101 upon receipt of the connectable AP list from the printing apparatus 102 performs the processing after S1006 based on the received AP list.

In this case, for APs included in the connection history and with the valid stealth function, the printing apparatus 102 itself can determine whether there are APs connectable to the printing apparatus 102. Thus, the connection destination candidates can be displayed with the candidates being narrowed down to information on APs reliably connectable to the printing apparatus 102.

According to one aspect of the above-described embodiment, when an AP as the device connection destination is set from an information processing apparatus, APs previously connected to the information processing apparatus are selectively displayed, and device network setting can be performed based on the selected AP.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154401, filed Aug. 5, 2016, which is hereby incorporated by reference herein in its entirety.

What is claimed is:

1. An information processing apparatus communicable with a device including a wireless interface, comprising:
    a wireless interface for performing wireless communication;
    a display device; and
    at least one processor that executes instructions to:
        make a search for, by transmitting a probe request including an SSID corresponding to an access point information previously connected to the information processing apparatus, a nearby access point corresponding to the SSID, wherein the access point information is stored in the information processing apparatus;
        display, on the display device, one or more access points found by the search, and
        transmit, to the device, setting information for connection to an access point selected by a user from the displayed one or more access points, using a wireless direct communication established with the device,
        wherein, in the search, a probe request including an SSID corresponding to an access point whose stealth SSID function is enabled is transmitted, upon condition that, as the access point information previously connected to the information processing apparatus, information of the access point whose stealth SSID function is enabled is stored.

2. The information processing apparatus according to claim 1, wherein an access point with a stealth function enabled is displayed, on the display device, on a priority basis.

3. The information processing apparatus according to claim 1, the at least one processor further causing the information processing apparatus to display, on the display device, the one or more access points found by the search and a display object for enabling input of information on an access point to be connected to the device.

4. The information processing apparatus according to claim 1, the at least one processor further causing the information processing apparatus to display, on the display device, one or more access points received from the device and connectable to the device and the one or more access points found by the search.

5. The information processing apparatus according to claim 1, wherein the setting information is transmitted by using the wireless direct communication via an access point which is provided by the device.

6. The information processing apparatus according to claim 1, wherein an access point provided by the device is not displayed on the display device even in a case where the access point previously connected to the information processing apparatus.

7. The information processing apparatus according to claim 1, wherein the at least one processor further causes the information processing apparatus to change, after transmitting the setting information to the device, the access point as a connection destination connected by the wireless interface based on the setting for connection to the selected access point.

8. A method for controlling an information processing apparatus communicable with a device including a wireless interface, the information processing apparatus including a wireless interface for performing wireless communication, comprising:
  searching for, by transmitting a probe request including an SSID corresponding to an access point information previously connected to the information processing apparatus, a nearby access point corresponding to the SSID, wherein the access point information is stored in the information processing apparatus, and wherein, in the searching, a probe request including an SSID corresponding to an access point whose stealth SSID function is enabled is transmitted, upon condition that, as the access point information previously connected to the information processing apparatus, information of the access point whose stealth SSID function is enabled is stored;
  displaying, on a display device, one or more access points found by the searching; and
  transmitting, to the device, setting information for connection to an access point selected by a user from the displayed one or more access points, using a wireless direct communication established with the device.

9. The control method according to claim 8, further comprising displaying, on a priority basis, an access point with a stealth function that is enabled.

10. The control method according to claim 8, further comprising displaying the one or more access points found by the searching and a display object for enabling input of information on an access point to be connected to the device.

11. The control method according to claim 8, further comprising displaying access points received from the device and connectable to the device and the one or more access points found by the searching.

12. The control method according to claim 8, wherein the setting information is transmitted by using the wireless direct communication via an access point which is provided by the device.

13. The control method according to claim 8, wherein an access point provided by the device is not displayed even in a case where the access point previously connected to the information processing apparatus.

14. The control method according to claim 8, further comprising changing, after transmitting the setting information to the device, the access point as a connection destination connected by the wireless interface based on the setting for connection to the selected access point.

15. A non-transitory computer-readable storage medium storing computer executable instructions for executing a method for controlling an information processing apparatus communicable with a device including a wireless interface, the information processing apparatus including a wireless interface connected to an access point to perform wireless communication with the device, the method comprising:
  searching for, by transmitting a probe request including an SSID corresponding to an access point information previously connected to the information processing apparatus, a nearby access point corresponding to the SSID, wherein the access point information is stored in the information processing apparatus, and wherein, in the searching, a probe request including an SSID corresponding to an access point whose stealth SSID function is enabled is transmitted, upon condition that, as the access point information previously connected to the information processing apparatus, information of the access point whose stealth SSID function is enabled is stored;
  displaying, on a display device, one or more access points found by the searching; and
  transmitting, to the device, setting information for connection to an access point selected by a user from the displayed one or more access points, using a wireless direct communication established with the device.

16. The information processing apparatus according to claim 1, wherein the access point whose stealth SSID function is enabled is an access point that does not periodically transmit a beacon signal including an SSID for identifying the access point whose stealth SSID function is enabled but transmits a beacon signal as a response to a probe request including an SSID for identifying the access point whose stealth SSID function is enabled only in a case where the probe request is received from outside.

17. The information processing apparatus according to claim 1, wherein the setting information includes an SSID corresponding to the access point selected by the user.

18. The control method according to claim 8, wherein the setting information includes an SSID corresponding to the access point selected by the user.

19. A method for setting a wireless network connection information of a device using an information processing apparatus and the device, the method comprising:
  searching for, by transmitting a probe request including an SSID corresponding to an access point information previously connected to the information processing apparatus, a nearby access point corresponding to the SSID, wherein the access point information is stored in the information processing apparatus;
  displaying, on a display device of the information processing apparatus, one or more access points found by the searching;
  transmitting, to the device, setting information for connection to an access point selected by a user from the displayed one or more access points, using a wireless direct communication established with the device; and
  changing, when the setting information is received from the information processing apparatus, the wireless network connection information of the device based on the received setting information;
  wherein the device attempts to get connected to an external access point based on the changed wireless network connection information of the device.

* * * * *